Nov. 25, 1952 — G. A. NIELSEN — 2,619,130
GANG RIPSAW
Filed Nov. 8, 1948 — 2 SHEETS—SHEET 2

INVENTOR
G. A. Nielsen

Patented Nov. 25, 1952

2,619,130

UNITED STATES PATENT OFFICE 2,619,130

GANG RIPSAW

Gordon A. Nielsen, Sacramento, Calif.

Application November 8, 1948, Serial No. 58,931

6 Claims. (Cl. 143—60)

This invention is directed to, and it is an object to provide, a gang rip saw, of novel construction, adapted for simultaneously cutting a plurality of wooden strips such as Venetian blind slats or the like.

Another object of the invention is to provide a gang rip saw, as above, which cuts rapidly and smoothly; being designed for self-cleaning of the sawdust from the saw blades.

A further object of the invention is to provide a gang rip saw which includes a plurality of straight saw blades disposed in adjacent but spaced-apart, parallel relation, and mounted in unitary relation for simultaneous reciprocation.

An additional object of the invention is to provide a gang rip saw, which includes a novel mounting and driving mechanism for the straight saw blades disposed as in the preceding paragraph; such mechanism being operative to impart rapid, short-stroke, vertical reciprocation to the saw blades, together with limited horizontal oscillation, the latter assuring of effective self-cleaning of said blades when the saw is in operation.

It is also an object of the invention to provide a gang rip saw which includes a novel device for tensioning the saw blades.

A further object of the invention is to provide a practical and reliable gang rip saw, and one which will be exceedingly effective for the purpose for which it is designed.

These objects are accomplished by means of such structure and relative arrangement of parts as will fully appear by a perusal of the following specification and claims.

Figure 1:
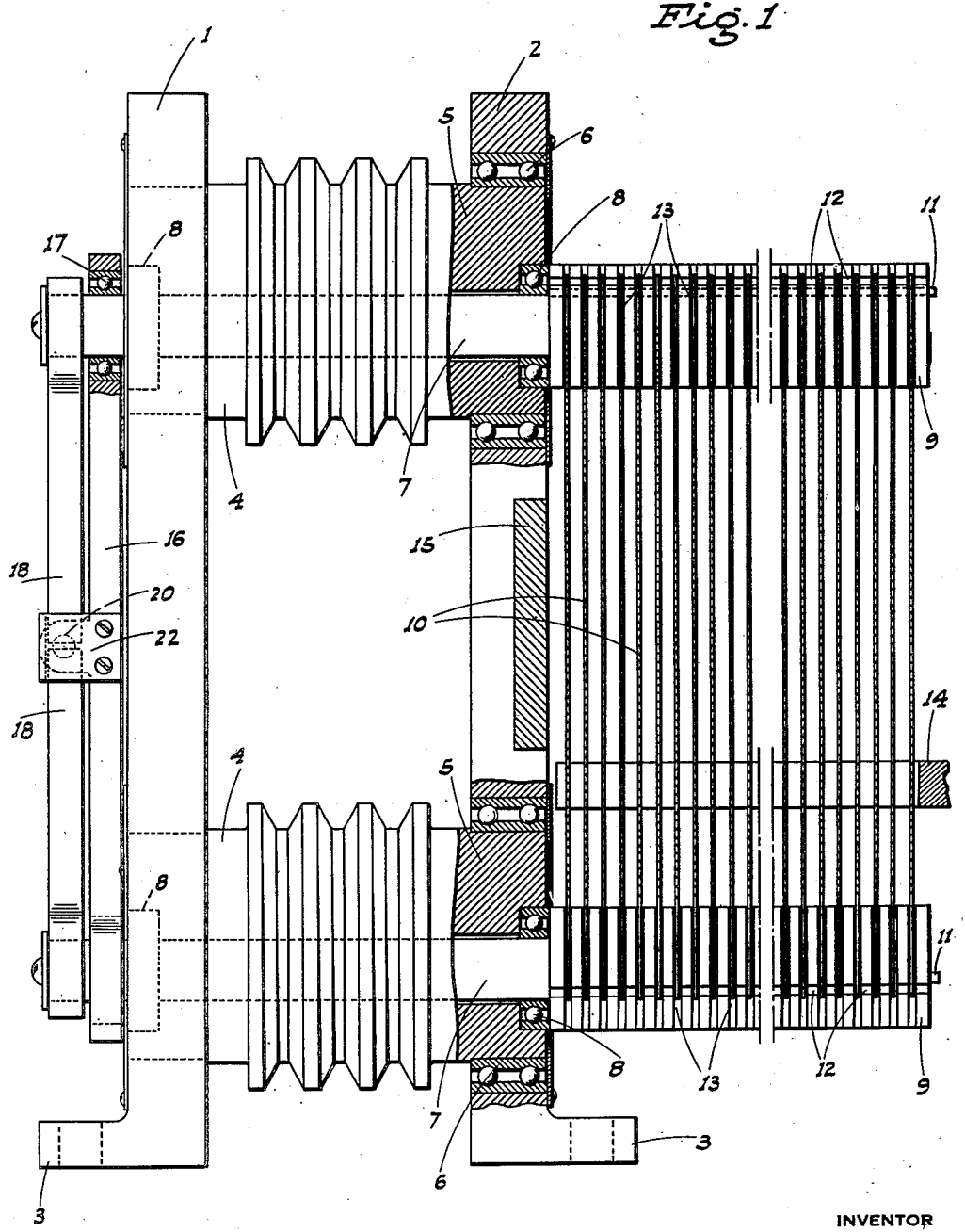
Fig. 1 is a front elevation of the gang rip saw, partly in section.
Figure 2:
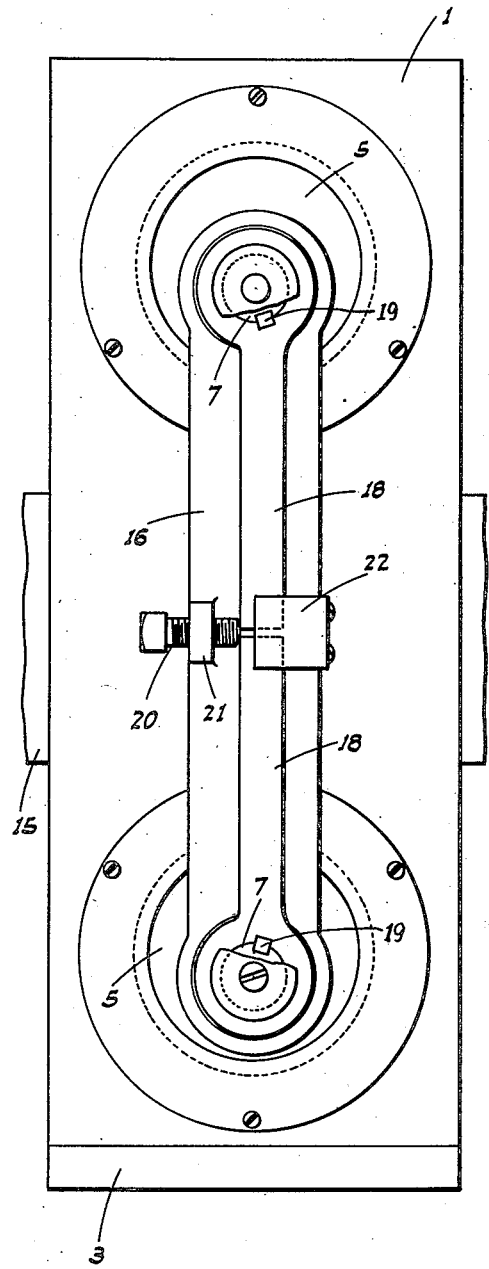
Fig. 2 is an end elevation of the gang rip saw showing particularly the assembly of the connecting rod and the saw blade tensioning device.
Figure 3:
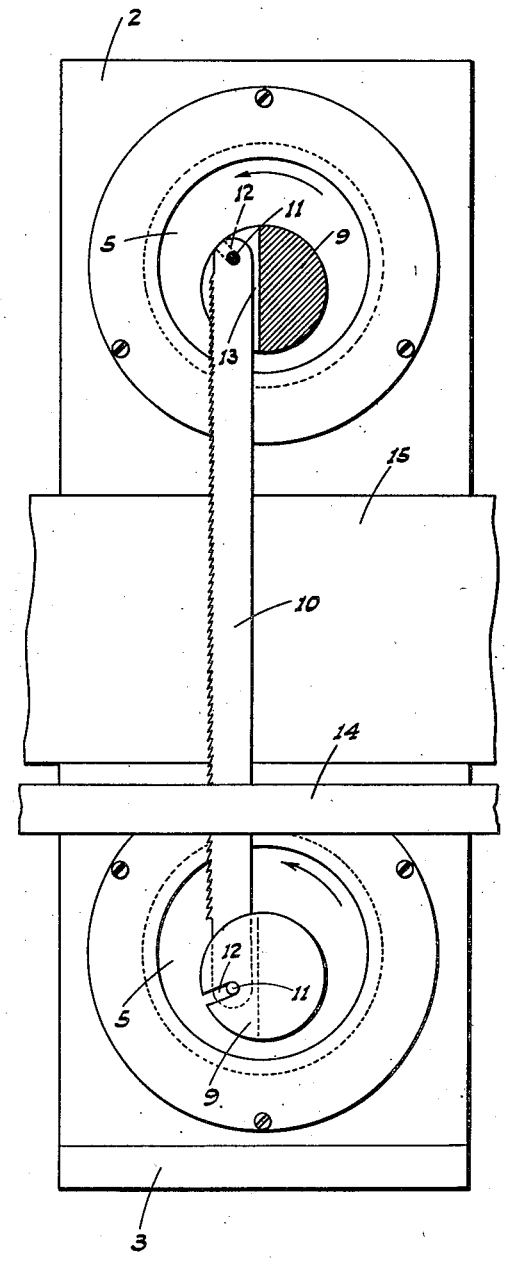
Fig. 3 is an elevation of the opposite end of the gang rip saw showing the manner of attachment of the saw blades between the mandrels, one mandrel being in section.

Referring now more particularly to the characters of reference on the drawings, the novel gang rip saw comprises a pair of upstanding frames 1 and 2 disposed in adjacent but spaced facing relation; said frames 1 and 2 including attachment feet 3 at their lower ends for securing said frames to a fixed support.

A pair of multiple V-pulley rotors 4 extend between the upstanding frames 1 and 2 in vertically spaced relation; said rotors 4 having relatively large-diameter end hubs 5 journaled in the corresponding frames by means of bearings 6; the rotors 4 thus being mounted for rotation about parallel axes, and said rotors being simultaneously driven, and in the same direction, by an endless belt and pulley drive mechanism (not shown).

Each rotor 4 has a shaft 7 extending therethrough parallel to the rotor axis but in eccentric relation thereto; the eccentricity of said shafts, with respect to the rotors 4, being the same.

The shafts 7 are journaled in the rotors 4 by bearings 8; the shafts 7 being non-rotary with respect to each other, but of course are journaled, as described, for rotation of the hubs 5 thereabout.

The shafts 7 are formed, laterally of the upstanding frame 2, with parallel, outwardly projecting mandrels 9, and a plurality of straight, upstanding saw blades 10 are connected in equally spaced side-by-side or facing relation between the mandrels 9 as follows:

Each mandrel 9 includes, in eccentric but parallel relation to its axis, a longitudinal pin 11 removably secured to the corresponding mandrel by notching, as at 12. The pins 11 extend through holes in the adjacent end portions of the saw blades 10; said saw blades projecting into slots 13 cut radially into the mandrels 9 for the reception of said blades. The pins 11 bear like eccentricity to the axes of the mandrels 9, and are disposed on the same side of said axes.

The saw blades 10 work through a horizontal table 14 mounted adjacent the upstanding frame 2 a slight distance above the lower rotor 4, and said upstanding frame 2 includes a horizontal, longitudinal work guide 15 mounted thereon.

Outwardly of the upstanding frame 1 the shafts 7 are coupled together by a rigid connecting rod 16 journaled, at opposite ends, to corresponding shafts by bearings 17.

The shafts 7 project outwardly beyond the connecting rod 6, and radial tension arms 18 are keyed to said shafts, as at 19, and thence project directly toward each other.

At their inner or adjacent ends the tension arms are both engaged, from one side, by an adjustment screw 20 which is threaded through a lateral lug 21 on the connecting rod 16. The tension arms 18 are engaged by a right angle guide 22 on the connecting rod 16 opposite the lug 21, whereby to maintain proper alinement and guiding of the tension arms 18 as moved by the adjustment screw 20.

The assembly of the tension arms 18 and adjustment screw 20 provides the device whereby proper tension is maintained on the saw blades 10. It will be seen that when the adjustment screw 20 is run inwardly, the tension arms 18 are urged in a corresponding direction, which results in limited rotation of the shafts 7 and mandrels 9 in predetermined opposite directions. Thus, as the pins 11 are eccentric, they are relatively separated, effectively tensioning the saw blades 10.

In operation of the described gang rip saw, the rotors 4 are driven simultaneously in the same direction as previously described. This causes the eccentric shafts 7 to describe an arc about the axes of the rotors 4, resulting in vertical reciprocation of the mandrels 9 and saw blades 10, coupled with limited horizontal oscillation thereof. With the saw blades 10 thus actuated they act, upon passage of a piece of lumber through the saw on the table 14, to cut such piece of lumber into a plurality of strips, for Venetian blind slats or the like. As the vertical reciprocation of the saw blades 10 is with a short stroke and at relatively great speed, the cutting action is fast and smooth. Additionally, as the saw blades 10 have limited horizontal oscillation, they are self-cleaning when in operation.

The connecting rod 16 serves the purpose of maintaining the shafts 7 in their proper relative eccentric positions. Additionally, the connecting rod provides the mount for the adjustment screw 20 and guide 22 which cooperate with the tension arms 18 at all times.

The described gang rip saw provides a very practical and reliable device for multiple strip cutting of lumber, and the structure is such that the saw blades 10 are mounted in a simple and effective manner, which permits of their easy and ready removal and replacement, as is necessary for sharpening.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A gang saw comprising a pair of spaced mandrels, a plurality of longitudinal saw blades extending between the mandrels in spaced side by side relation, means pivotally connecting the saw blades at their ends to the mandrels in eccentric relation to the axes of the latter, means mounting the mandrels for power driven reciprocation as a unit, and means associated with said mounting means operative to cause opposed relative rotation of said mandrels in a predetermined direction whereby to tension the saw blades.

2. A gang saw, as in claim 1, in which the mandrels include spaced, parallel shafts; said last named means including radial arms fixed on the shafts and projecting toward each other, and an adjustment device cooperating with said arms to swing them in a direction which causes reverse rotation of the shafts.

3. A gang saw comprising an upstanding frame, a pair of vertically spaced rotors journaled on the frame in parallel relation, said rotors being adapted to be power rotated in the same direction, a shaft journaled in each rotor in eccentric, parallel relation to the axis of the rotor, the shafts having mandrels on one end projecting horizontally from the frame, a plurality of longitudinal saw blades extending between the mandrels in spaced side by side relation, means connecting the saw blades at their ends to corresponding mandrels, and means separate from the blades tying the shafts together against rotation about their axes.

4. A gang saw comprising an upstanding frame, a pair of vertically spaced rotors journaled on the frame in parallel relation, said rotors being adapted to be power rotated in the same direction, a shaft journaled in each rotor in eccentric, parallel relation to the axis of the rotor, the shafts having mandrels on one end projecting horizontally from the frame, a plurality of longitudinal saw blades extending between the mandrels in spaced side by side relation, means pivotally connecting the saw blades at their ends to the mandrels in eccentric relation to the axes of the latter, radial levers fixed on the shafts and projecting toward each other, and means normally fixedly but adjustably securing said levers against swinging motion; said levers being adjustable in a direction to cause opposed rotation of the shafts in directions to tension the eccentrically connected saw blades.

5. A gang saw comprising an upstanding frame, a pair of vertically spaced rotors journaled on the frame in parallel relation, said rotors being adapted to be power rotated in the same direction, a shaft journaled in each rotor in eccentric, parallel relation to the axis of the rotor, the shafts having mandrels on one end projecting horizontally from the frame, a plurality of longitudinal saw blades extending between the mandrels in spaced side by side relation, means pivotally connecting the saw blades at their ends to the mandrels in eccentric relation to the axes of the latter, the shafts projecting at their other ends from the rotors, a connecting rod extending between and journaled to said projecting ends of the shafts, radial levers fixed on said projecting ends of the shaft and extending toward each other lengthwise of and adjacent the connecting rod, and means on the latter engaging the levers and adjustably urging the same in a direction to cause saw blade tightening relative rotation of said shafts and mandrels.

6. A gang saw comprising an upstanding frame, a pair of vertically spaced rotors journaled on the frame in parallel relation, said rotors being adapted to be power rotated in the same direction, a shaft journaled in each rotor in eccentric, parallel relation to its axis, the shafts having mandrels on one end projecting horizontally from the frame, means to tie the shafts together against rotation about their axes, a plurality of longitudinal saw blades extending between the mandrels in spaced side by side relation, the mandrels being slotted transversely from one side to receive the end portions of the blades and the latter having holes through said end portions, and pins mounted in the mandrels eccentric but parallel to the axes thereof and removably passing across the slots and through the blade holes.

GORDON A. NIELSEN.

REFERENCES CITED

The following references are of record in the file of this patent:

UNITED STATES PATENTS

| Number | Name | Date |
| --- | --- | --- |
| 496 | Ambler | Dec. 1, 1837 |
| 19,300 | Ketcham | Feb. 9, 1858 |
| 71,265 | Beach | Nov. 26, 1867 |

FOREIGN PATENTS

| Number | Country | Date |
| --- | --- | --- |
| 681,600 | France | 1930 |